(12) United States Patent
Kalsi et al.

(10) Patent No.: US 12,373,676 B2
(45) Date of Patent: Jul. 29, 2025

(54) TECHNIQUES FOR ACCELERATING NEURAL NETWORKS

(71) Applicant: Intel Corporation, Santa Clara, CA (US)

(72) Inventors: Gurpreet S Kalsi, Bangalore (IN); Ramachandra Chakenalli Nanjegowda, Bangalore (IN); Kamlesh R Pillai, Bangalore (IN); Sreenivas Subramoney, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 895 days.

(21) Appl. No.: 17/172,627

(22) Filed: Feb. 10, 2021

(65) Prior Publication Data

US 2021/0166114 A1 Jun. 3, 2021

(51) Int. Cl.
*G06N 3/063* (2023.01)
*G06F 17/16* (2006.01)
*G06N 3/04* (2023.01)
*G06N 3/0442* (2023.01)
*G06N 3/045* (2023.01)

(52) U.S. Cl.
CPC .............. *G06N 3/063* (2013.01); *G06F 17/16* (2013.01); *G06N 3/04* (2013.01)

(58) Field of Classification Search
CPC ........... G06N 3/063; G06N 3/04; G06F 17/16
See application file for complete search history.

(56) References Cited

U.S. PATENT DOCUMENTS

2017/0024645 A1\* 1/2017 Socher ................. G06N 3/042
2018/0046901 A1\* 2/2018 Xie ....................... G06F 7/5443
(Continued)

FOREIGN PATENT DOCUMENTS

CN 111368988 A 7/2020

OTHER PUBLICATIONS

Zhang et al., "Combining Convolution Nueral Network and Bidirectional Gated Recurrent Unit for Sentence Semantic Classification," IEEE Access, vol. 6, pp. 73750-73759, published Nov. 22, 2018, 10 pages.

(Continued)

*Primary Examiner* — Kamran Afshar
*Assistant Examiner* — Steven H Phung
(74) *Attorney, Agent, or Firm* — Hanley, Flight & Zimmerman, LLC

(57) ABSTRACT

Embodiments are generally directed to techniques for accelerating neural networks. Many embodiments include a hardware accelerator for a bi-directional multi-layered GRU and LC neural network. Some embodiments are particularly directed to a hardware accelerator that enables offloading of the entire LC+GRU network to the hardware accelerator. Various embodiments include a hardware accelerator with a plurality of matrix vector units to perform GRU steps in parallel with LC steps. For example, at least a portion of computation by a first matrix vector unit of a GRU step in a neural network may overlap at least a portion of computation by a second matrix vector unit of an output feature vector for the neural network. Several embodiments include overlapping computation associated with a layer of a neural network with data transfer associated with another of the neural network.

18 Claims, 9 Drawing Sheets

(56) References Cited

U.S. PATENT DOCUMENTS

| | | | | |
|---|---|---|---|---|
| 2020/0193273 | A1* | 6/2020 | Chung | G06F 17/16 |
| 2020/0302304 | A1* | 9/2020 | Hu | G06T 1/60 |
| 2021/0034788 | A1* | 2/2021 | Savagaonkar | G06F 21/602 |
| 2021/0150362 | A1* | 5/2021 | Zhang | G06N 3/063 |
| 2021/0166114 | A1 | 6/2021 | Kalsi et al. | |
| 2021/0244377 | A1* | 8/2021 | Amoh | A61B 5/7257 |
| 2021/0397933 | A1* | 12/2021 | Boesch | G06N 3/045 |

OTHER PUBLICATIONS

Agarap, "A Neural Network Architecture Combining Gated Recurrent Unit (GRU) and Support Vector Machine (SVM) for Intrusion Detection in Network Traffic Data," retrieved from arXiv:1709. 03082v, published Feb. 7, 2019, 5 pages.

Wu et al., "A Short-Term Load Forecasting Method Based on GRU-CNN Hybrid Neural Network Model," Hindawi Mathematical Problems in Engineering, vol. 2020, Article ID 1428104, pp. 1-10, published Mar. 21, 2020, 10 pages.

International Searching Authority, "Written Report of the International Searching," issued in connection with International Patent Application No. PCT/US2022/011815, mailed on Apr. 22, 2022, 5 pages.

International Searching Authority, "International Search Report," issued in connection with International Patent Application No. PCT/US2022/011815, mailed on Apr. 22, 2022, 4 pages.

International Searching Authority, "Preliminary Report on Patentability," issued in connection with International Patent Application No. PCT/US2022/011815, mailed on Aug. 24, 2023, 7 pages.

Author Unknown, "Analysis solutions for nanopore sequencing data" Nanopore Technologies—© 2008-2021 Oxford Nanopore Technologies.

E. Nurvitadhi, Jaewoong Sim, D. Sheffield, A. Mishra, S. Krishnan and D. Marr, "Accelerating recurrent neural hetworks in analytics servers: Comparison of FPGA, CPU, GPU, and ASIC," 2016 26th International Conference on Field Programmable Logic and Applications (FPL), 2016, pp. 1-4, doi: 10.1109/FPL.2016.7577314.

Teng, Haotian et al. "Chiron: translating nanopore raw signal directly into nucleotide sequence using deep learning." GigaScience vol. 7,5 (2018): giy037. doi:10.1093/gigascience/giy037.

Massigham, Tim., "Flappie" Oxford Nanopore Technologies—© 2021 GitHub, Inc.

Z. Wu, K. Hammad, R. Mittmann, S. Magierowski, E. Ghafar-Zadeh and X. Zhong, "FPGA-based DNA Basecalling Hardware Acceleration," 2018 IEEE 61st International Midwest Symposium on Circuits and Systems (MWSCAS), 2018, pp. 1098-1101, doi: 10.1109/MWSCAS.2018.8623988.

Author Unknown, "tinyTPU" © 2021 GitHub, Inc. URL: https://github.com/jofrfu/tinyTPU.

Xu, Chen & Yao, Jianqiang & Lin, Zhouchen & Ou, Wenwu & Yuanbin, Cao & Wang, Zhirong & Zha, Hongbin. (2018). Alternating Multi-bit Quantization for Recurrent Neural Networks.

Baluja, Shumeet & Marwood, David & Covell, Michele & Johnston, Nick. (2018). No Multiplication? No Floating Point? No Problem! Training Networks for Efficient Inference.

Zhe Li et al: "E-RNN: Design Optimization for Efficient Recurrent Neural Networks in FPGAs", 25th International Symposium on High-Performance Computer Architecture (HPCA 2019), available from https://arxiv.org/pdf/1812.07106, dated Dec. 12, 2018, 12 pages.

Qin Li et al: "Efficient Methods for Mapping Neural Machine Translator on FPGAs", IEEE Transactions on Parallel and Distributed Systems, IEEE, USA, vol. 32, No. 7, published Dec. 25, 2020, pp. 1866-1877, available from https://ieeexplore.ieee.org/stamp/stamp.jsp?tp=&arnumber=9309170, 12 pages.

European Patent Office, "Extended European Search Report," issued in connection with European Patent Application No. 22753101.9, dated Dec. 11, 2024, 7 pages.

\* cited by examiner

TECHNIQUES FOR ACCELERATING NEURAL NETWORKS

TECHNICAL FIELD

Embodiments described herein generally relate to techniques for accelerating neural networks, such as with a hardware accelerator.

BACKGROUND

Machine learning is the study of computer algorithms that improve automatically through experience. Typically, machine learning algorithms build a model based on sample data, referred to as training data, in order to make predictions or decisions without explicitly being programmed to do so. Machine learning computer algorithms include artificial neural networks (or neural networks). Self-learning resulting from experience can occur within neural networks, which can derive conclusions from a complex and seemingly unrelated set of information. One type of neural networks include gated recurrent units (GRU) and linear classifiers (LC). A GRU is a gating mechanism in recurrent neural networks. An LC classifies an object based on the value of a linear combination of characteristics of the object.

DETAILED DESCRIPTION

Figure 1:
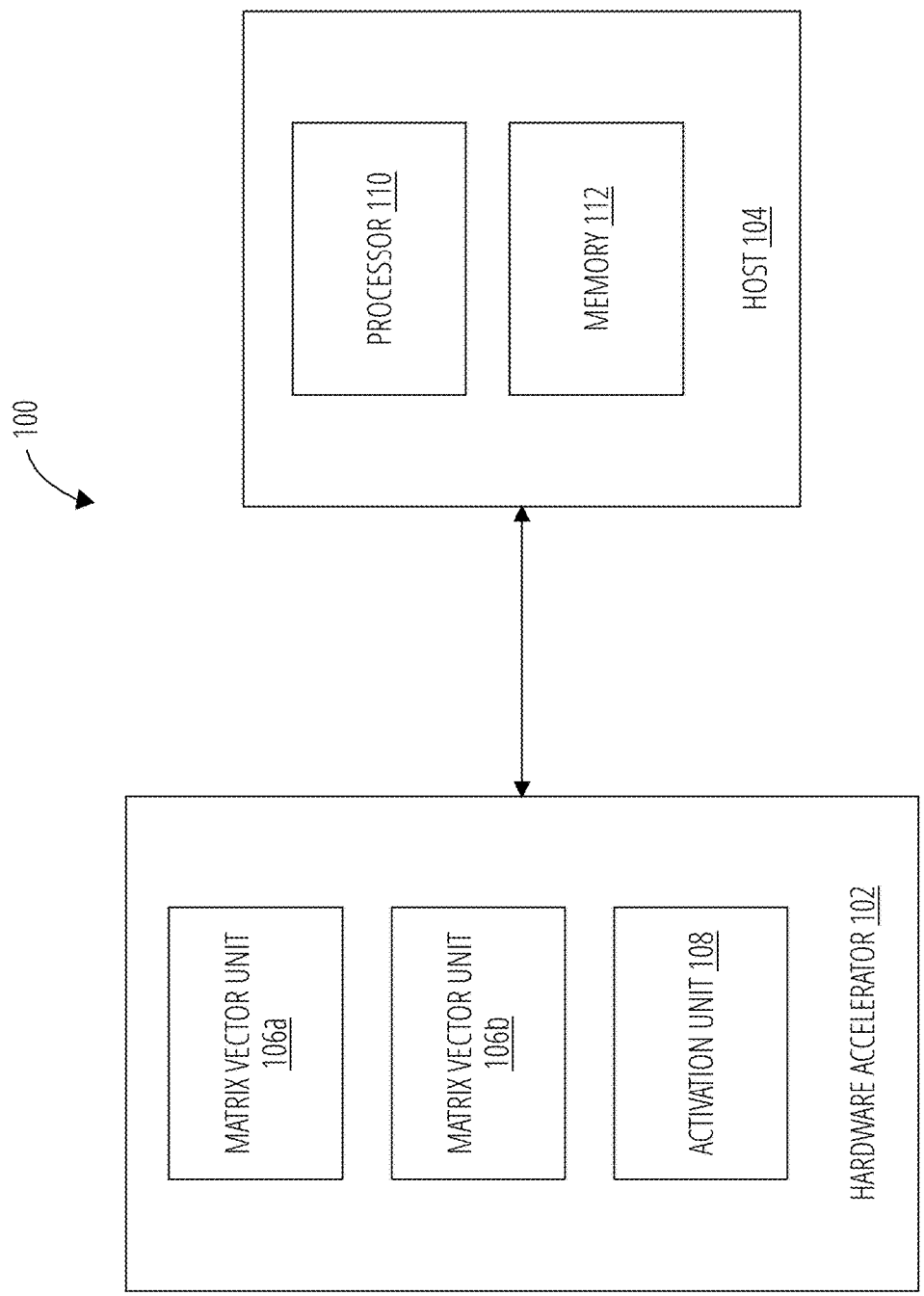
FIG. 1 illustrates an exemplary operating environment for a hardware accelerator according to one or more embodiments described herein.

Various embodiments are generally directed to techniques for accelerating neural networks, such as with a hardware accelerator, for instance. Many embodiments include a hardware accelerator for a bi-directional multi-layered GRU and LC neural network. Some embodiments are particularly directed to a hardware accelerator that enables offloading of the entire LC+GRU network to the hardware accelerator, such as by using a single function call mapped to the hardware accelerator. Various embodiments include a hardware accelerator with a plurality of matrix vector units to perform GRU steps in parallel with LC steps. For example, at least a portion of computation by a first matrix vector unit of a GRU step in a neural network may overlap at least a portion of computation by a second matrix vector unit of an output feature vector for the neural network. Several embodiments include overlapping computation associated with a layer of a neural network with data transfer associated with another of the neural network. These and other embodiments are described and claimed.

Many challenges face the efficient computation of neural networks, such as matrix operations in bi-directional multi-layered GRU and LC neural networks. These challenges include a significant amount of data that needs to be moved between the hardware accelerator and the host. In fact, existing hardware may spend around 75% of the total execution time in data transfer between memory and the host. Often times, matrix vector unit operations (e.g., general matrix-vector multiplication (GEMV) and/or general matrix multiply (GEMM)) may be offloaded, but the output of the matrix vector unit operations still need to be transferred back to the host to perform remaining steps of the GRU and LC. Attempts to remedy the issue by offloading the entire GRU step unnecessarily raises the granularity of the compute. Further, these attempts fail to consider the data transfer cost (transferring the output feature vector for the next step) after each GRU step. However, the number of GRU steps is proportional to the feature vector size and hence the data transfer cost is proportional to the size of the output vector. For example, when the GRU operations are implemented on a hardware accelerator and activation on LC operations are implemented on the host, the size of data transferred in in the order of a few hundred megabytes (MBs). Additionally, attempts to remedy the issue by coupling a convolutional neural network (CNN) with a recurrent neural network (RNN) and a connectionist temporal classification (CTC) decoder accelerated using multiple graphical processing units (GPUs), such as in Chiron®, unnecessarily reduces accuracy. Also, hardware accelerators designed specifically for GEMV operations in GRU or CNN based neural networks are not able to offload multiple layers that are a mix of LC and GRU as a single compute function. Further, hardware accelerators are not able to fuse LC and GRU layers together at the algorithmic level to allow the LC and GRU layers to be run in parallel and increase input processing speed, leading to significant output vector data transfer cost, which in turn increases the energy consumption. Such limitations can drastically reduce the usability and applicability of neural networks, contributing to lost economies of scale, missed insights, and inefficient systems, devices, and techniques with limited capabilities.

Various embodiments described hereby include a hardware accelerator that enables offloading of an entire LC+GRU network, such as a single function call mapped to the hardware accelerator. Many embodiments enable overlap of the data transfer of one layer with the compute of another layer by overlapping the execution of computations by matrix vector units with data transfers by the memory controller. Several embodiments enable inter-layer parallelism by buffering the inter-layer data on the hardware accelerator, without the need to transfer the inter-layer data back and forth on and off the hardware accelerator.

More generally, embodiments may include an energy efficient hardware accelerator for neural networks, such as a bi-directional, multi-layered GRU+LC (or GRU and LC) based neural network. Various embodiments address the high data transfer costs challenges by enabling offloading of the entire GRU+LC layer to the hardware accelerator. In many embodiments, the hardware accelerator includes two matrix vector (matvec) compute units and a single activation unit, which can run in a pipelined fashion to achieve compute overlap. One of the matrix vector units can compute the GRU step of a current layer, while the other matrix vector unit does the LC computation and produces the feature vector of a next layer (compute overlap). The input/output feature vectors can be read/written to/from the hardware accelerator when the computation is happening (transfer overlap). The output of a GRU operation can be reused for the next layer and fed to an LC operation to generate the output feature vector (data buffering). Additionally, batching and/or weight quantization may be utilized to further reduce computation time and resource demand.

In these and other ways, components/techniques described hereby may achieve significant acceleration of GRU+LC neural network inference with reduced data transfer costs and better energy efficiency, resulting in several technical effects and advantages over conventional computer technology, including increased capabilities and improved performance. In various embodiments, one or more of the aspects, techniques, and/or components described hereby may be implemented in a practical application via one or more computing devices, and thereby provide additional and useful functionality to the one or more computing devices, resulting in more capable, better functioning, and improved computing devices. For example, a practical application may include a single function call that enables offloading of an entire LC+GRU network to a hardware accelerator. In a further example, the single function call may be utilized to improve performance of an application such as sequence-to-sequence modelling applications (e.g., speech recognition, natural language processing, and genomic data processing). Further, one or more of the aspects, techniques, and/or components described hereby may be utilized to improve the technical fields of hardware accelerators, neural networks, inferencing, linear classifiers, grated recurrent units, and sequence-to-sequence modelling applications.

In several embodiments, components described hereby may provide specific and particular manners to enable development, evaluation, management, and optimization of ML models. In many embodiments, one or more of the components described hereby may be implemented as a set of rules that improve computer-related technology by allowing a function not previously performable by a computer that enables an improved technological result to be achieved. For example, the function allowed may include one or more of the specific and particular techniques disclosed hereby such as generating output data including offloading an entire LC+GRU network to a hardware accelerator, overlapping one or more of computations and data transfers, buffering data, batching data, and/or quantizing weights.

With general reference to notations and nomenclature used hereby, one or more portions of the detailed description which follows may be presented in terms of program procedures executed on a computer or network of computers. These procedural descriptions and representations are used by those skilled in the art to effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in many cases, in any of the operations described hereby that form part of one or more embodiments. Rather, these operations are machine operations. Useful machines for performing operations of various embodiments include general purpose digital computers as selectively activated or configured by a computer program stored within that is written in accordance with the teachings hereby, and/or include apparatus specially constructed for the required purpose. Various embodiments also relate to apparatus or systems for performing these operations. These apparatuses may be specially constructed for the required purpose or may include a general-purpose computer. The required structure for a variety of these machines will be apparent from the description given.

Reference is now made to the drawings, whereby like reference numerals are used to refer to like elements throughout. In the following description, for purpose of explanation, numerous specific details are set forth in order to provide a thorough understanding thereof. It may be evident, however, that the novel embodiments can be practiced without these specific details. In other instances, well known structures and devices are shown in block diagram form to facilitate a description thereof. The intention is to cover all modification, equivalents, and alternatives within the scope of the claims.

FIG. 1 illustrates an exemplary operating environment 100 according to one or more embodiments described hereby. Operating environment 100 may include a hardware accelerator 102 and a host 104. The hardware accelerator 102 may include a first matrix vector unit 106a, a second matrix vector unit 106b, and an activation unit 108. The host 104 may include a processor 110 and memory 112. In various embodiments described hereby, the hardware accelerator 102 may perform one or more computations in performing a neural network inference. For example, host 104 may offload GRU and LC operations to the hardware accelerator 102. Embodiments are not limited in this context.

In several embodiments, hardware accelerator 102 may be utilized to accelerate bi-directional, multi-layered GRU+LC (or GRU and LC) neural networks. This type of neural network can be used in sequence-to-sequence modelling applications, like speech recognition, natural language processing, and genomic data processing. For instance, Oxford Nanopore Technologies® (ONT) is an emerging genome sequencing technology that relies on GRU+LC based neural networks to infer genome sequences (reads) from data generated by a sequencing device. This process may be referred to as Basecalling in genomics terminology. Profiling of the ONT-flappie algorithm indicates that around 75% of the time is spent in data transfer between memory of the hardware accelerator 102 and host 104. As these applications require large data sets (e.g., for a sample bacterial data set the size of the output feature vector is on the order of a few hundred MBs), mapping on matrix vector operations (e.g., GEMV or GEMM operations) introduces a significant amount of data to be moved between memory of the hardware accelerator 102 and the host 104.

Various techniques and devices described hereby may be used to accelerate such bi-directional, multi-layered GRU+LC based neural networks used in applications like Basecalling. Additionally, or alternatively, these techniques and devices can help in accelerating these applications along with reducing the data transfers between host 104 and hardware accelerator 102 memory. Further, reduced data transfers and computational speed ups can be achieved without imposing a heavy area and/or power costs. For example, hardware accelerator 102 can enable offloading of an entire LC+GRU network from host 104, such as a single function call mapped to the hardware accelerator 102. In many embodiments, to access the hardware accelerator 102, software/compiler of the host 104 may schedule data in a format compatible with the hardware accelerator 102. Many embodiments enable overlap of the data transfer of one layer with the compute of another layer by overlapping the execution of computations by matrix vector units with data transfers by the memory controller. Several embodiments enable inter-layer parallelism by buffering the inter-layer data on the hardware accelerator 102, without the need to transfer the inter-layer data back and forth on and off the hardware accelerator 102.

In many embodiments, the hardware accelerator includes two matrix vector (matvec) compute units (e.g., matrix vector unit 106a and matrix vector unit 106b) and a single activation unit (e.g., activation unit 108), which can run in a pipelined fashion to achieve compute overlap. For example, computer overlap may be achieved by having one of the matrix vector units can compute the GRU step of a current layer, while the other matrix vector unit does the LC computation and produces the feature vector of a next layer. In another example, transfer overlap may be achieved by reading/writing the input/output feature vectors to/from the hardware accelerator 102 while the computation is happening. In yet another example, data buffering may be achieved by reusing the output of a GRU operation for the next layer and feeding the output of the GRU operation to an LC operation to generate the output feature vector.

Mapping genomics basecalling stages to the hardware accelerator 102 can result in a computational speed up and a reduced data transfer cost. Further, mapping a layer of GRU+LC neural networks also can enable batching of multiple inputs, which can enable further computational gains. Similarly, quantization along with batching can enable still further computational gains. These and other aspects will be described in more detail below.

Figure 2:
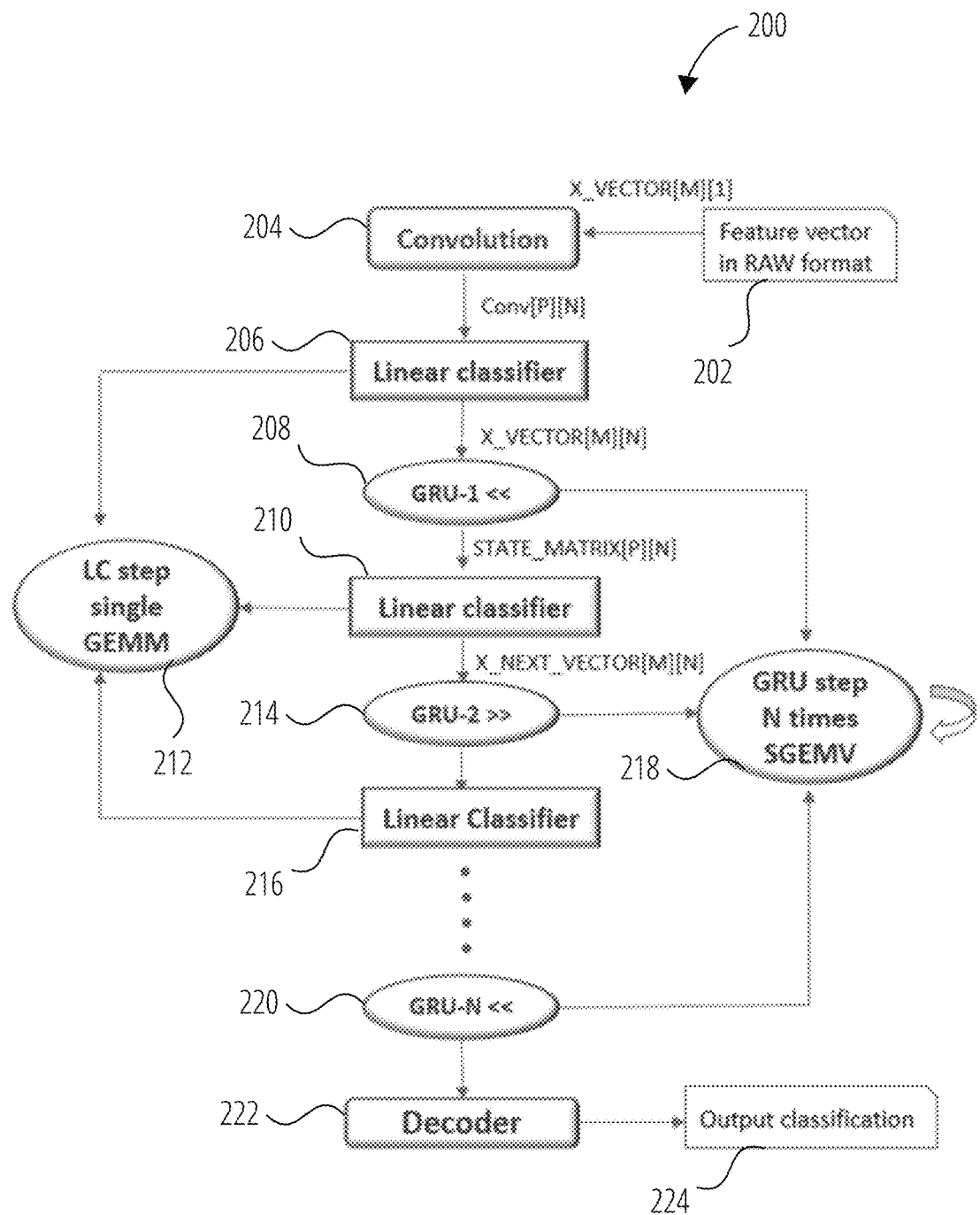
FIG. 2 illustrates a process flow for an exemplary neural network according to one or more embodiments described herein.

FIG. 2 illustrates an exemplary process flow 200 according to one or more embodiments described hereby. Process flow 200 may illustrate a sample neural network that combines an initial CNN layer followed by multiple bi-directional GRU+LC layers. One or more embodiments described hereby may include or utilize a hardware accelerator to perform one or more of the bi-directional GRU+LC layers as part of performing an inference according to the process flow 200. Embodiments are not limited in this context.

GRU+LC based neural networks have been implemented in a variety of areas, such as speech recognition, natural language processing, genomic data processing, and the like. More generally, these networks attempt to translate a fixed-length input to a fixed-length output using the combined power of LC and GRU. The LC aspect may be used for feature extraction, whereas the GRU aspect may be used for learning dependencies across an input sequence. For example, in speech processing, LC aspects may extract word or character combinations and GRU aspects may learn word or character dependencies.

Referring back to FIG. 2, each GRU time-step computation may use fixed weights (SW), current input (Ir), and previous history ($O_{t-1}$) to produce current output ($O_t$). The output may also be influenced by update gate ($z_t$) and reset gate ($r_t$), which determine how much information from previous steps is carried and/or ignored in the output. Computationally, many of these steps happen as dense GEMVs of the weight matrices with input and output state vectors. In various embodiments, each LC computation uses fixed weights (W) and current input vector ($X_{m \times n}$) to produce next layer output (x_next$_{m \times n}$). In various such embodiments, this may correspond to logical/software dataflow inputs required to produce output, as opposed to a physical mapping of the functionality to the hardware accelerator. Computationally, each LC computation is equivalent to GEMMs of weight matrices with the feature vector. Algorithmically, each LC computation is equivalent to GEMVs if fused into each step of GRU.

Figure 3:
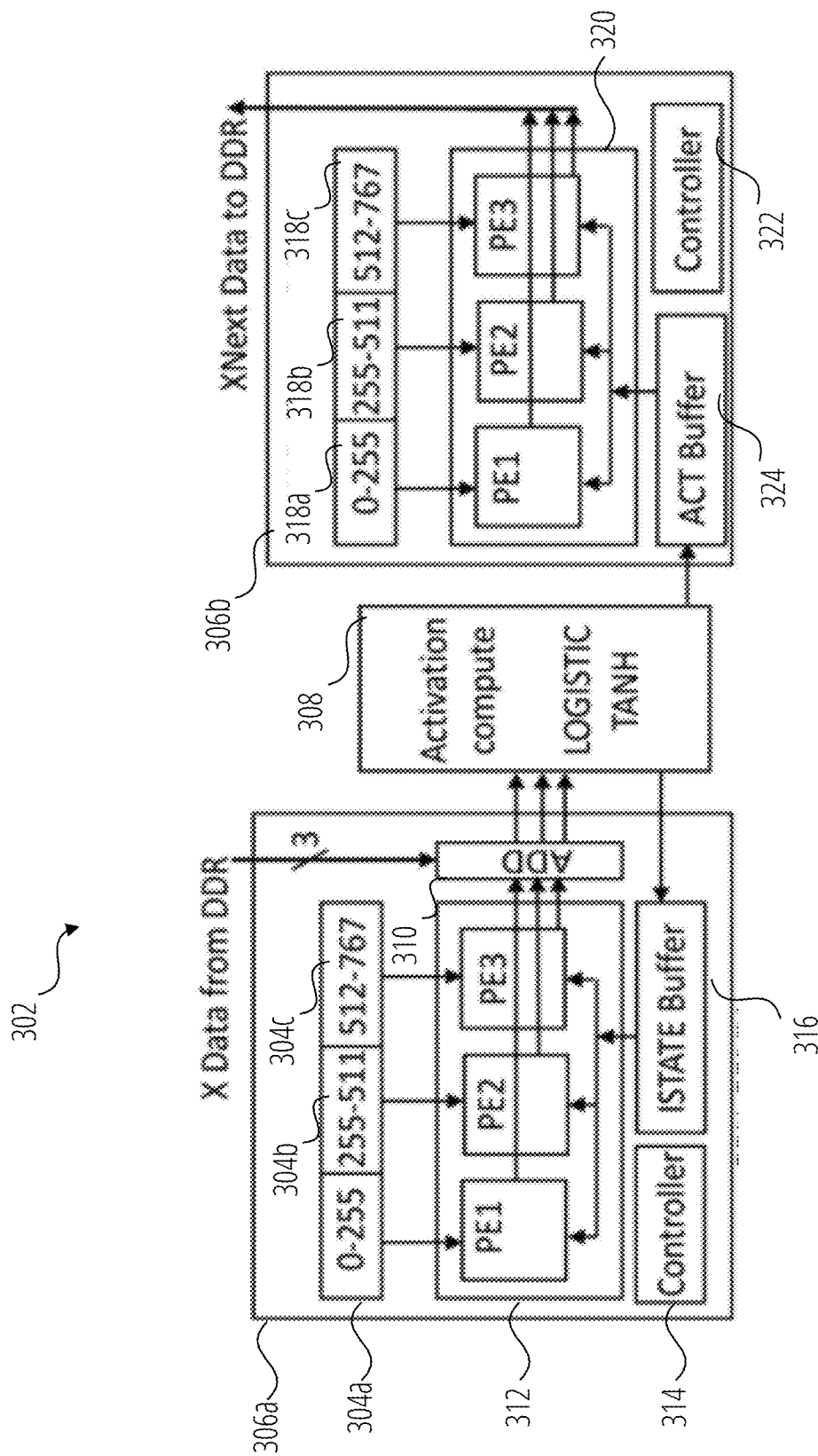
FIG. 3 illustrates aspects of an exemplary hardware accelerator according to one or more embodiments described herein.

FIG. 3 illustrates a block diagram of an exemplary hardware accelerator 302 according to one or more embodiments described hereby. The hardware accelerator 302 includes matrix vector unit 306a, matrix vector unit 306b, and activation unit 308. In one or more embodiments, the matrix vector unit 306a may be utilized for GRU operations in the hardware accelerator 302 and the matrix vector unit 306b may be utilized for LC operations in the hardware accelerator 302. The matrix vector unit 306a includes buffer banks 304a, 304b, 304c, adder 310, GRU processing engines 312, GRU controller 314, and ISTATE buffer 316. The matrix vector unit 306b includes buffer banks 318a, 318b, 318c, LC processing engines 320, LC controller 322, and activation buffer 324. In one or more embodiments, buffer banks 304a, 304b, 304c may store the first weight matrix and buffer banks 318a, 318b, 318c may store the second weight matrix. In various embodiments, FIG. 3 illustrates an overview of the microarchitecture for one or more hardware accelerators described hereby. In some embodiments, FIG. 3 may include one or more components that are the same or similar to one or more other components described hereby. For example, matrix vector unit 306a may be the same or similar as matrix vector unit 106a of FIG. 1. Embodiments are not limited in this context.

Figure 4:
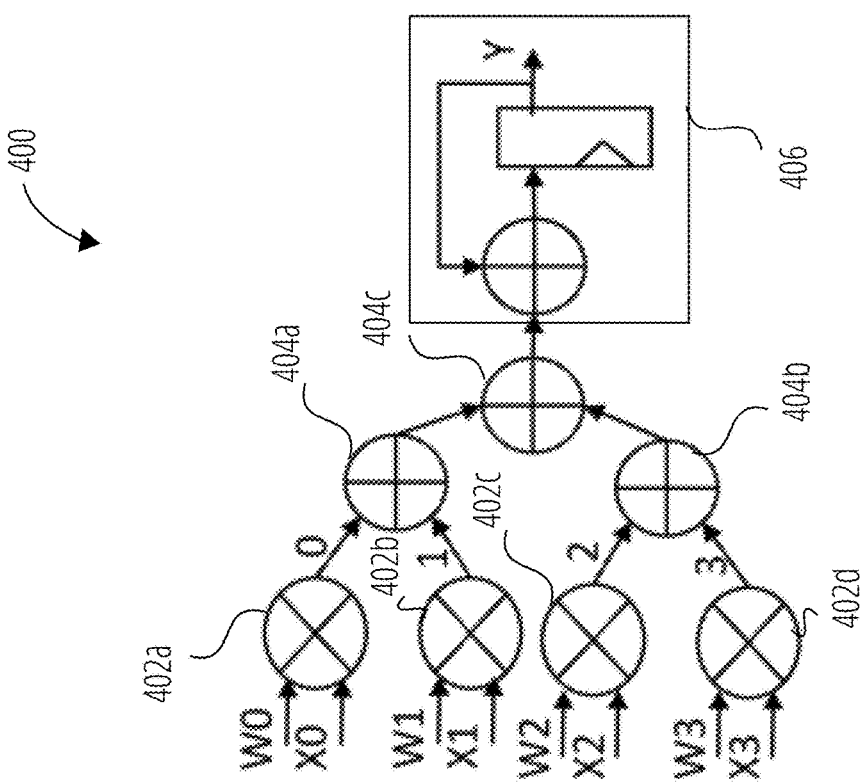
FIG. 4 illustrates aspects of an exemplary processing engine according to one or more embodiments described herein.

FIG. 4 illustrates a block diagram of an exemplary processing engine 400 according to one or more embodiments described hereby. The processing engine 400 may include multiplication blocks 402a, 402b, 402c, 402d, summation blocks 404a, 404b, 404c, and accumulator 406. In various embodiments described hereby, each matrix vector unit may include one or more processing engines. For example, three processing engines 400 may be utilized to perform, in parallel, the three general matrix-vector multiplications of a single GRU operation. In some embodiments, FIG. 4 may include one or more components that are the same or similar to one or more other components described hereby. For example, each of GRU processing engines 312 and LC processing engines 320 of FIG. 3 may be the same or similar to processing engine 400. Embodiments are not limited in this context.

Figure 5:
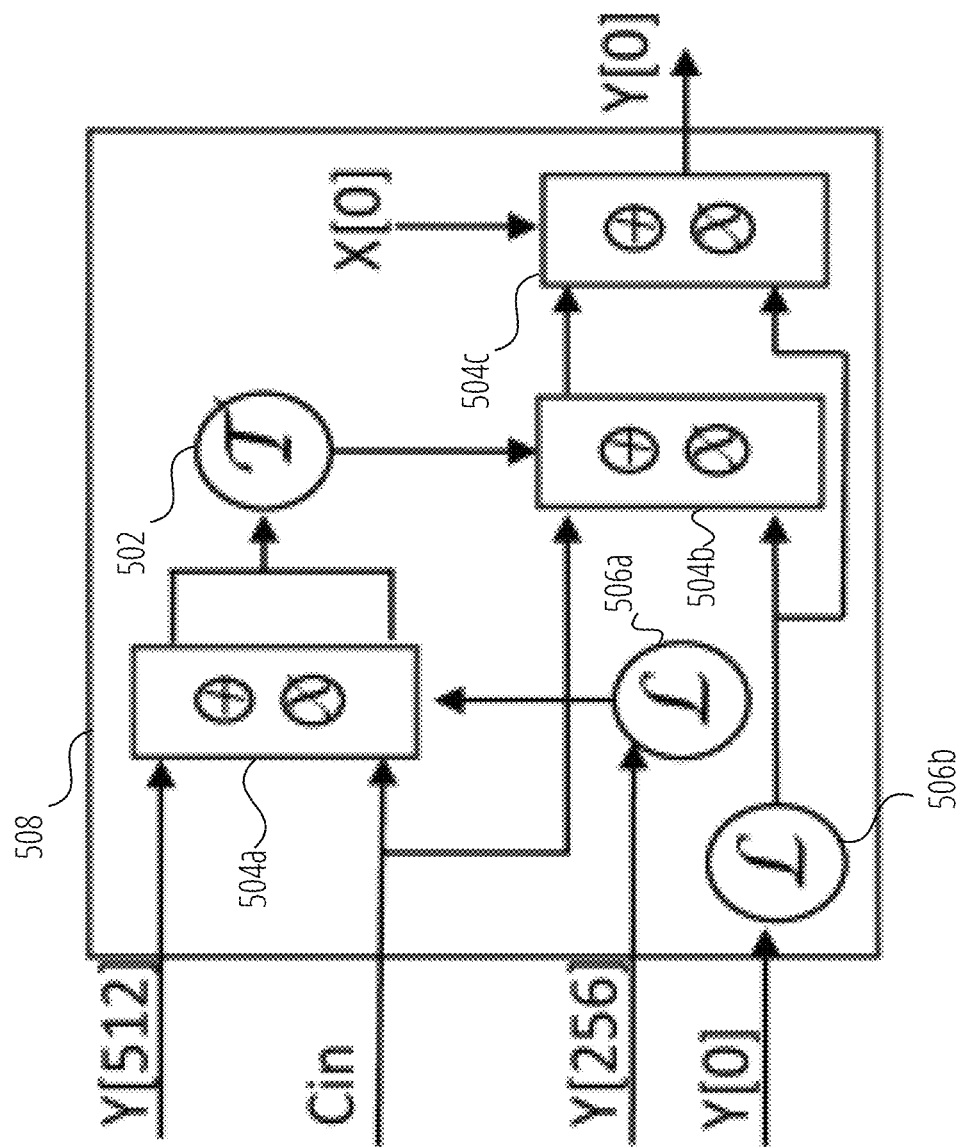
FIG. 5 illustrates aspects of an exemplary activation unit according to one or more embodiments described herein.

FIG. 5 illustrates a block diagram of an exemplary activation unit 508 according to one or more embodiments described hereby. The activation unit 508 may include hyperbolic tangent function 502, multiplication/summation blocks 504a, 504b, 504c, and logistic functions 506a, 506b. In various embodiments described hereby, the output from each processing engine is provided to the activation unit 508. After activation, the second matrix vector unit uses the output from the activation unit 508 and a second weight matrix to compute an output feature vector for the next layer. In some embodiments, FIG. 5 may include one or more components that are the same or similar to one or more other components described hereby. For example, activation unit 508 may be the same or similar to activation unit 308 of FIG. 3. Embodiments are not limited in this context.

Collectively, FIGS. 3-5 may illustrate an exemplary microarchitecture for various hardware accelerators disclosed hereby, such as hardware accelerator 102. On the hardware accelerator 302, each of the matrix vector units 306a, 306b may be a dot product engine (DPE) that executes the dot product of a single row of the weight matrix with the state vector. The three PEs (e.g., of LC processing engines 320 and/or GRU processing engines 312) may represent the three GEMVs of a single GRU operation in parallel. The output generated by each PE of GRU processing engines 312 is fed into the activation unit 308. In various embodiments, after activation, the matrix vector unit 306b and LC processing engines 320 can use the second weight matrix and the output in memory of the hardware accelerator 302 (e.g., static-random access memory (SRAM) and/or activation buffer 324) to compute another GEMV using the dot product engine; further, the matrix vector units 306b may send the next layer vector (e.g., XNEXT) to memory of the host (e.g., double data rate (DDR) Synchronous Dynamic Random-Access memory (SDRAM)). In various such embodiments, this may correspond to a physical mapping of the functionality to the hardware accelerator as opposed to logical/software dataflow inputs required to produce output.

In some embodiments, the hardware accelerator 102 may include a field programmable gate array (FPGA). The on-chip memory provided by an FPGA may store intermediate data generated between GRU iterations, but the on-chip memory may not be able to store the intermediate data (XNEXT) required for the next layer. Accordingly, the intermediate data (XNEXT) required for the next layer may be transferred it back to the host memory. However, it will be appreciated that this data transfer can readily be overlapped with computation. In some embodiments, the GRU matrix-vector unit 606a may generate a current output vector based on an input feature vector for the current layer of the neural network, and the activation unit 608 generates an activation vector based on the current output vector generated by the GRU matrix-vector unit 606a. In some such embodiments, the LC matrix-vector unit 606b may generate the feature vector for the next layer of the neural network based on the activation vector generated by the activation unit.

Figure 6:
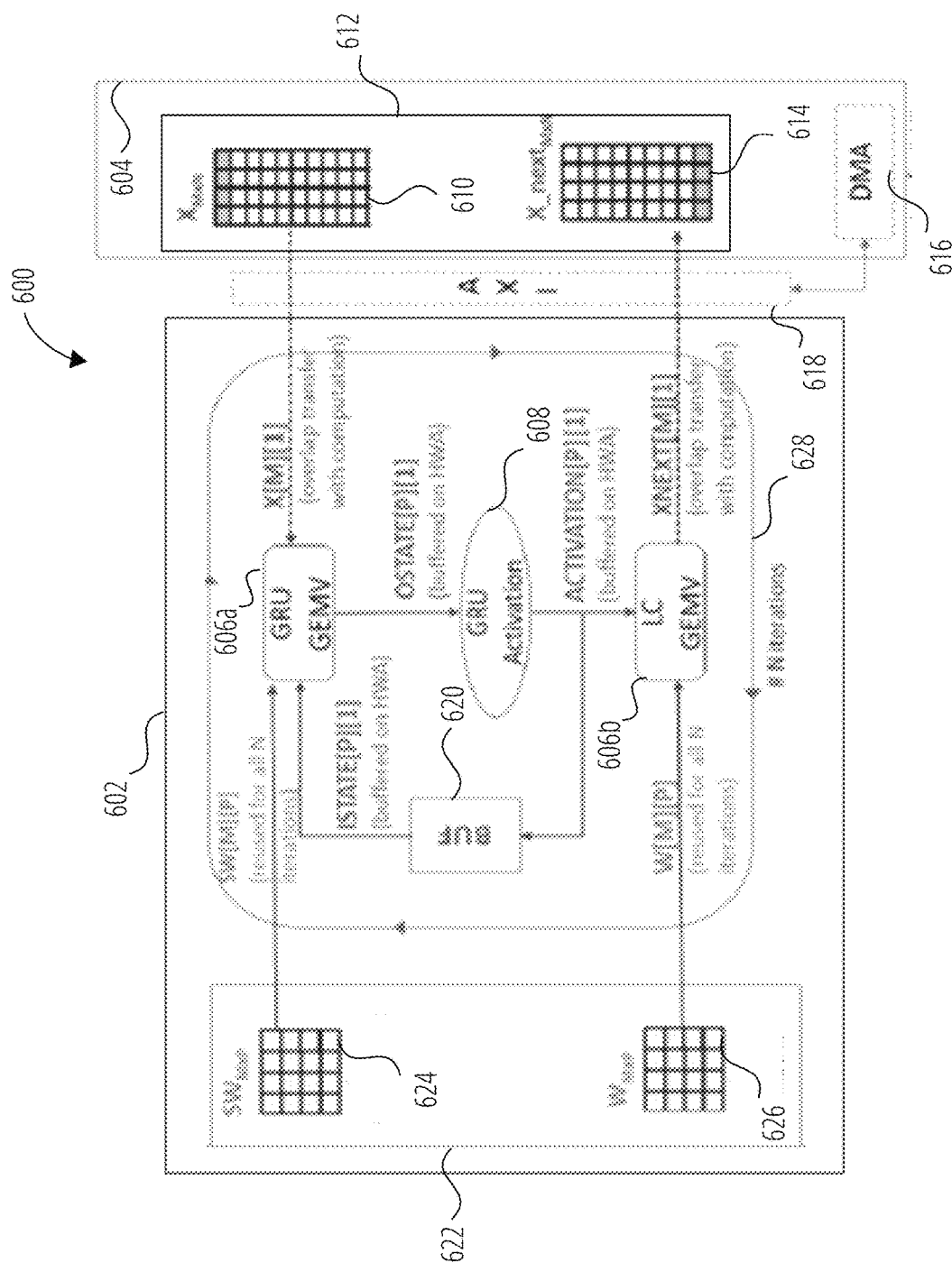
FIG. 6 illustrates an exemplary operating environment for a hardware accelerator according to one or more embodiments described herein.

FIG. 6 illustrates an exemplary operating environment 600 according to one or more embodiments described hereby. Operating environment 600 may include hardware accelerator 602, host 604, and advanced extensible interface (AXI) 618. The hardware accelerator 602 may include GRU matrix-vector unit 606a, LC matrix-vector unit 606b, activation unit 608, buffer 620, and cache 622 with GRU weight matrix 624 and LC weight matrix 626. The host 604 may include direct memory access (DMA) circuitry 616 and host memory 612 with current-layer feature vector 610 and next-layer feature vector 614. In many embodiments, a plurality of iterations 628 may be performed. In some embodiments, FIG. 6 may include one or more components that are the same or similar to one or more other components described hereby. For example, activation GRU matrix-vector unit 606a may be the same or similar to matrix vector unit 306a. Embodiments are not limited in this context.

The illustrated embodiments of FIG. 6 may illustrate the system architecture of an exemplary hardware accelerator 602. As previously mentioned, the hardware accelerator 602 includes GRU matrix-vector unit 606a and LC matrix-vector unit 606b, each of which may include GEMV units that can run simultaneously. Additionally, the activation unit 608 may perform LOGISTIC and TANH activation on hidden states. At the microarchitecture level, the hardware accelerator 602 includes buffer 620 to store ISTATE and ACTIVATION vector, such as for multiplication with the weight matrices SW and W. The weight matrices SW and W, which are used for a number of iterations 628, can be stored in cache 622 (e.g., an L1 cache). The reuse of the weight matrices SW and W can help to increase the residency of data, thereby reducing the external memory bandwidth. In many embodiments, to access the hardware accelerator 602, software/compiler of the host 604 may schedule data in a format required by the hardware accelerator 602.

Some embodiments disclosed hereby may utilize batching of inputs. A batch of input signals may be processed so that memory fetches can be amortized over a larger amount of compute, which can reduce energy per read and shift the workload to be more compute-bound. In some embodiments, multiple instances of the accelerator core and processing multiple inputs in parallel is utilized to improve throughput. In the ONT pipeline, multiple reads are generated as separate input files (e.g., fast5 format, five layers) and can be processed independently of each other. Accordingly, one or more embodiments scale embodiments described above to instantiate multiple copies of the core dot product and activation engine to process multiple reads in parallel. The read-only weight data in the cache 622 (e.g., SRAM) can be broadcast to each of the instances in parallel. The feature vector and the output vector can be read from and written to the host memory 612 (e.g., DDR) using a single port when the host memory 612 request ratio to instance compute ratio is 1:64 (i.e., in every 64 cycles, the multiplication of a row from the weight matrix and the state vector will complete and a new memory request will be made by an instance to fetch the next row of the feature vector). In some embodiments, the hardware accelerator may include a memory controller. In some such embodiments, the memory controller may receive an input feature vector for a current layer of a neural network from a host memory in an input data transfer that utilizes a port, and the memory controller may transfer the output feature vector for a next layer of the neural network to the host memory in an output data transfer that utilizes the port.

In various embodiments, the feature vector may only be read and written at the beginning and end of computation of a single GRU step. In various such embodiments, this can enable the feature vector transfer to overlap with computation. In several embodiments, at least a portion of computation of an output feature vector for a next layer of the neural network by a second matrix vector unit overlaps at least a portion of the input data transfer. In many embodiments, at least a portion of computation of a GRU step for a current layer of a neural network by a first matrix vector unit overlaps at least a portion of an output data transfer.

Various embodiments disclosed hereby may implement weight quantization. Weight quantization may be implemented in a manner to reduce memory consumption without losing accuracy. For example, weights in the range of −1 to 127 may be utilized. In one or more embodiments, 2-bit or 3-bit quantization may be utilized for running GRU operations and/or LC operations with little to no loss of accuracy. In many embodiments, bit quantization may be performed by limiting or reducing the number of significant digits utilized in calculations, such as by limiting, removing, or preventing the calculation of one or more least significant digits (or least significant bits) for values. In some embodiments, a 1-byte and/or 2-byte quantized implementation of TANH may be utilized with little to no loss of performance on regression and classification tasks. In many embodiments, the GRU weights and LC weights from all five layers of an instance can be quantized to fit within 3 megabytes of on-chip buffer. This can improve the effectiveness of on-chip buffers and reduce the data movement cost throughout the system. In one embodiment, the GRU and LC transformation FP32 weight matrices were quantized into 1-byte and 2-byte integer weight matrices and then reconverted back to FP32 weight before being used for executing GRU layers. The output was then compared to output using a nonquantized approach to determine a less than 0.5% loss in accuracy. In some embodiments, one or more of computation by a first matrix vector unit of a GRU step for a current layer and computation by a second matrix vector unit of an output feature vector for a next layer of a neural network utilizes a weight matrix quantized to two or three bits.

With no batching and no quantization approximately 50% of execution time (or time) is spent transferring the GRU weight matrix and approximately 50% of time is spent transferring the LC weight matrix. Without batching the data transfer cost is dominant (e.g., as 1.5 MB weight matrices per layer are read from DDR for each of the 5 GRU layers and for every read in the batch). With batching, but without quantization, approximately 41% of time is spent transferring the LC weight matrix, approximately 41% of time is spent transferring the GRU weight matrix, approximately 7% of the time is spent computing GEMV with activation, and approximately 11% of time is spent reading/writing the feature vectors (X and Xnext). With batching, the weights of a layer in SRAM can be reused to perform a single layer of all reads in a batch before moving on to reading the weights and processing the next layer of all reads in the same batch. Although batching may reduce data transfer cost, the weights may still be read as many times as the number of layers, and the data transfer costs continues to dominates execution time. In some embodiments, batching may store intermediate results of processing each layer for each read, which incurs additional memory costs. With batching and quantization, approximately 62% of time is spent computing GEMV with activation and approximately 38% of time is spent reading/writing the feature vectors (X and Xnext). In various embodiments, weight quantization is utilized to fit all the weight matrices in cache memory (e.g., SRAM), which can eliminate the need to access weight matrices from other memory (e.g., DRAM). As a result, the data transfer cost associated with the weight matrix is can be effectively eliminated and the execution time is improved further. Following these optimizations, the execution time is mainly dominated by the compute time and feature vector transfer time. As discussed in previous section, the feature vector transfer can overlap with computation as it is read and written only at the beginning and end of the computation of a single GRU step.

Figure 7:
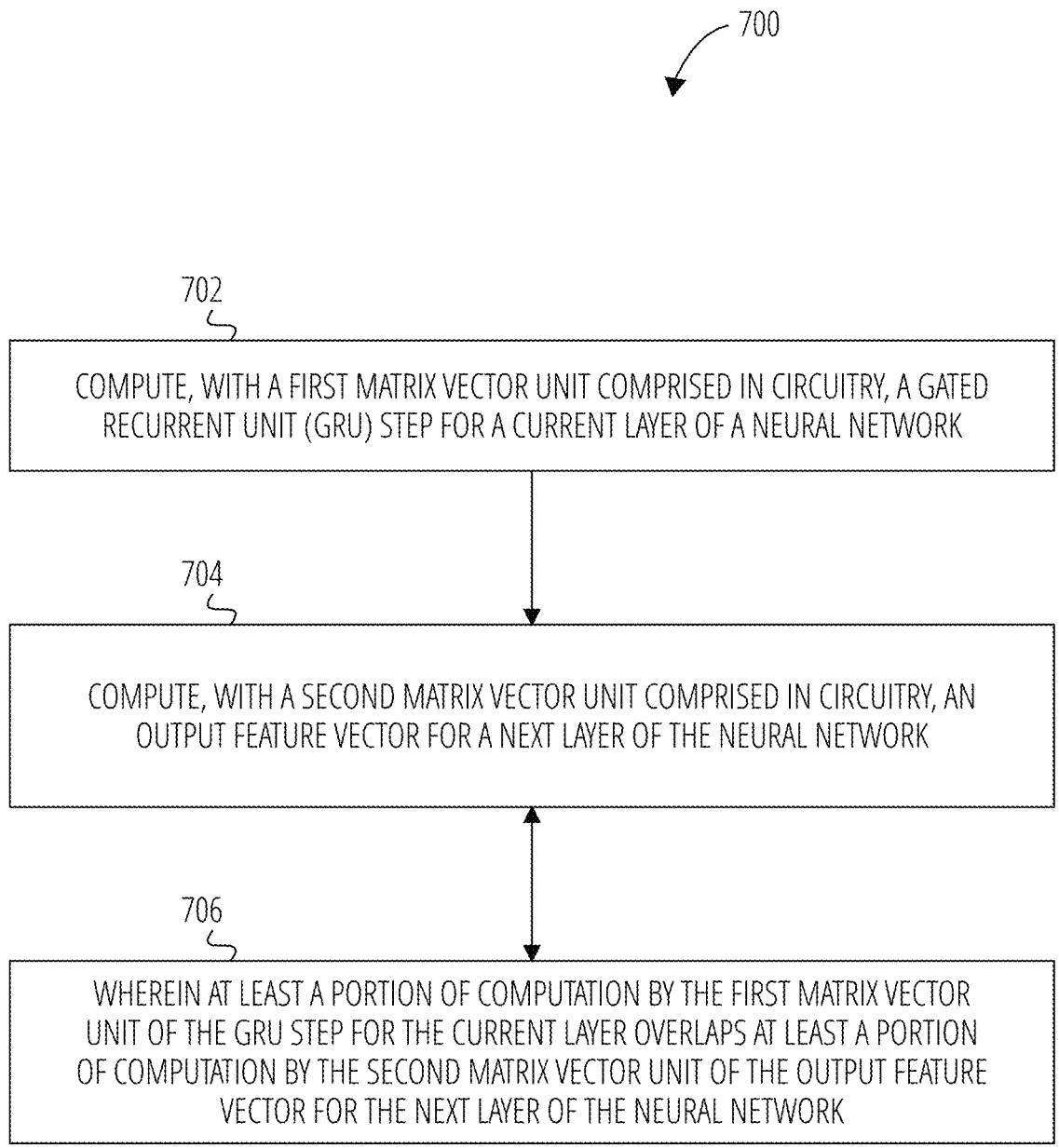
FIG. 7 illustrates an exemplary logic flow according to one or more embodiments described herein.

FIG. 7 illustrates one embodiment of a logic flow 700, which may be representative of operations that may be executed in various embodiments in conjunction with techniques disclosed hereby. The logic flow 700 may be representative of some or all of the operations that may be executed by one or more components/devices/environments described herein, such as hardware accelerator 102. The embodiments are not limited in this context.

In the illustrated embodiment, logic flow 700 may begin at block 702. At block 702 "compute, with a first matrix vector unit comprised in circuitry, a gated recurrent unit (GRU) step for a current layer of a neural network" a GRU step for a current layer of a neural network may be computed by a first matrix vector unit. For example, GRU matrix-vector unit 606a may compute a GRU layer for a current layer of a neural network. In some embodiments, the neural network is a bi-directional multi-layered GRU+LC based neural network.

Continuing to block 704 "compute, with a second matrix vector unit comprised in circuitry, an output feature vector for a next layer of the neural network" an output feature vector for a next layer of the neural network may be computed by a second matrix vector unit. For example, LC matrix-vector unit 606b may compute an output feature vector for a next layer of a neural network. In some embodiments, the neural network is a bi-directional multi-layered GRU+LC based neural network.

Proceeding to block 706 "wherein at least a portion of computation by the first matrix vector unit of the GRU step for the current layer overlaps at least a portion of computation by the second matrix vector unit of the output feature vector for the next layer of the neural network" at least a portion of computation by the first matrix vector unit of the GRU step for the current layer overlaps at least a portion of computation by the second matrix vector unit of the output feature vector for the next layer of the neural network. For example, at least a portion of the computation of a GRU step for a current layer of a neural network with GRU matrix-vector unit 606a may overlap at least a portion of the computation of an output feature vector for a next layer of the neural network by LC matrix-vector unit 606b.

Figure 8:
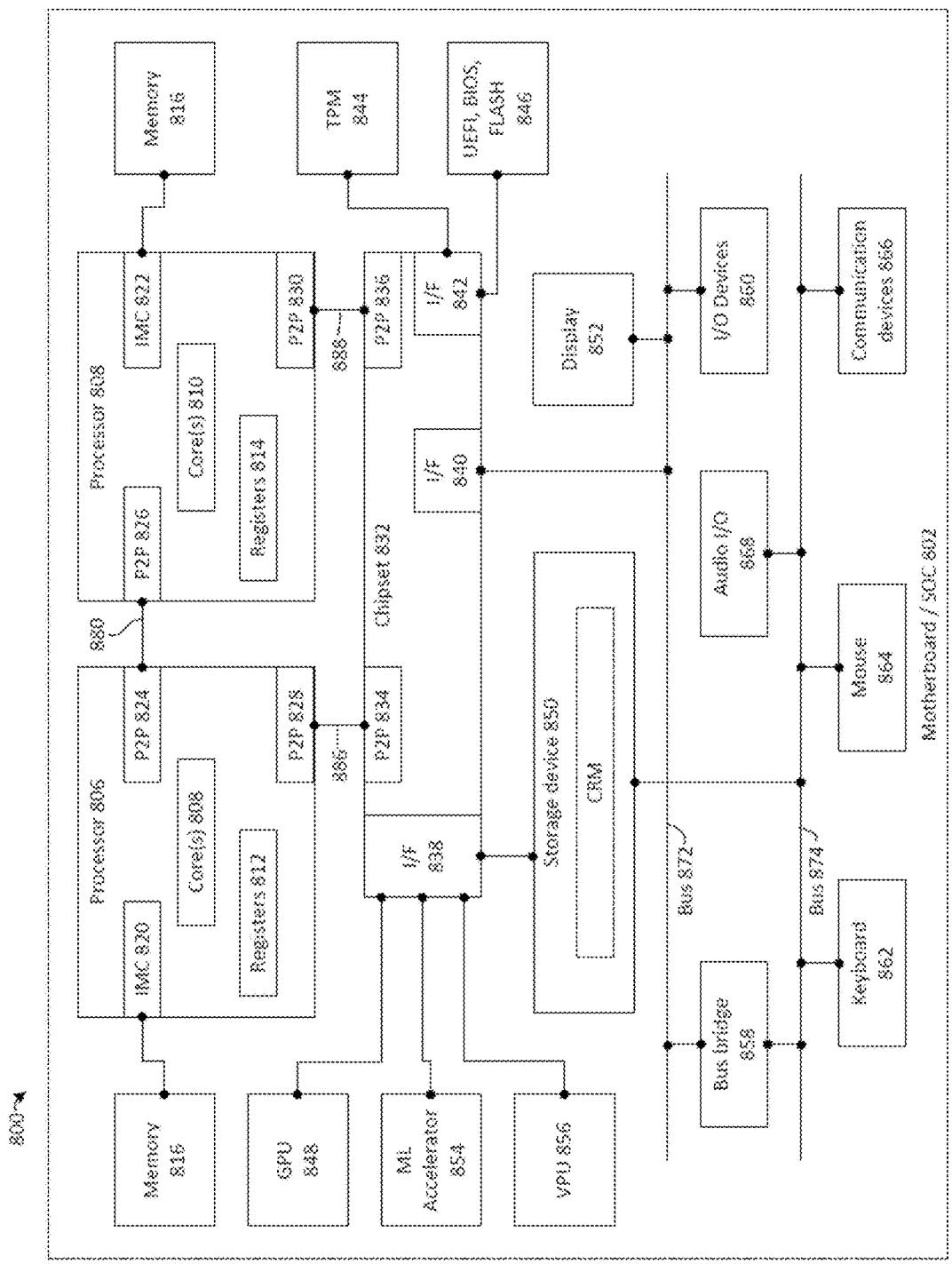
FIG. 8 illustrates exemplary aspects of a computing system according to one or more embodiments described herein.

FIG. 8 illustrates an embodiment of a system 800 that may be suitable for implementing various embodiments described hereby. System 800 is a computing system with multiple processor cores such as a distributed computing system, supercomputer, high-performance computing system, computing cluster, mainframe computer, mini-computer, client-server system, personal computer (PC), workstation, server, portable computer, laptop computer, tablet computer, handheld device such as a personal digital assistant (PDA), or other device for processing, displaying, or transmitting information. Similar embodiments may comprise, e.g., entertainment devices such as a portable music player or a portable video player, a smart phone or other cellular phone, a telephone, a digital video camera, a digital still camera, an external storage device, or the like. Further embodiments implement larger scale server configurations. In other embodiments, the system 800 may have a single processor with one core or more than one processor. Note that the term "processor" refers to a processor with a single core or a processor package with multiple processor cores. In at least one embodiment, the computing system 800, or one or more components thereof, is representative of one or more components described hereby, such as hardware accelerator 102, host 104, hardware accelerator 302, processing engine 400, activation unit 508, hardware accelerator 602, GRU matrix-vector unit 606a, LC matrix-vector unit 606b, cache 622, or buffer 620. More generally, the computing system 800 is configured to implement all logic, systems, logic flows, methods, apparatuses, and functionality described hereby with reference to FIGS. 1-9. The embodiments are not limited in this context.

As used in this application, the terms "system" and "component" and "module" are intended to refer to a computer-related entity, either hardware, a combination of hardware and software, software, or software in execution, examples of which are provided by the exemplary system 800. For example, a component can be, but is not limited to being, a process running on a processor, a processor, a hard disk drive, multiple storage drives (of optical, solid-state, and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

As shown in this figure, system 800 comprises a motherboard or system-on-chip (SoC) 802 for mounting platform components. Motherboard or system-on-chip (SoC) 802 is a point-to-point (P2P) interconnect platform that includes a first processor 804 and a second processor 806 coupled via a point-to-point interconnect 870 such as an Ultra Path Interconnect (UPI). In other embodiments, the system 800 may be of another bus architecture, such as a multi-drop bus. Furthermore, each of processor 804 and processor 806 may be processor packages with multiple processor cores including core(s) 808 and core(s) 810, respectively. While the system 800 is an example of a two-socket (2S) platform, other embodiments may include more than two sockets or one socket. For example, some embodiments may include a four-socket (4S) platform or an eight-socket (8S) platform. Each socket is a mount for a processor and may have a socket identifier. Note that the term platform refers to the motherboard with certain components mounted such as the processor 804 and chipset 832. Some platforms may include additional components and some platforms may only include sockets to mount the processors and/or the chipset. Furthermore, some platforms may not have sockets (e.g. SoC, or the like).

The processor 804 and processor 806 can be any of various commercially available processors, including without limitation an Intel® Celeron®, Core®, Core (2) Duo®, Itanium®, Pentium®, Xeon®, and XScale® processors; AMD® Athlon®, Duron® and Opteron® processors; ARM® application, embedded and secure processors; IBM® and Motorola® DragonBall® and PowerPC® processors; IBM and Sony® Cell processors; and similar processors. Dual microprocessors, multi-core processors, and other multi-processor architectures may also be employed as the processor 804 and/or processor 806. Additionally, the processor 804 need not be identical to processor 806.

Processor 804 includes an integrated memory controller (IMC) 820 and point-to-point (P2P) interface 824 and P2P interface 828. Similarly, the processor 806 includes an IMC 822 as well as P2P interface 826 and P2P interface 830. IMC 820 and IMC 822 couple the processors processor 804 and processor 806, respectively, to respective memories (e.g., memory 816 and memory 818). Memory 816 and memory 818 may be portions of the main memory (e.g., a dynamic random-access memory (DRAM)) for the platform such as double data rate type 3 (DDR3) or type 4 (DDR4) synchronous DRAM (SDRAM). In the present embodiment, the memories memory 816 and memory 818 locally attach to the respective processors (i.e., processor 804 and processor 806). In other embodiments, the main memory may couple with the processors via a bus and shared memory hub.

System 800 includes chipset 832 coupled to processor 804 and processor 806. Furthermore, chipset 832 can be coupled to storage device 850, for example, via an interface (I/F) 838. The I/F 838 may be, for example, a Peripheral Component Interconnect-enhanced (PCI-e). Storage device 850 can store instructions executable by circuitry of system 800 (e.g., processor 804, processor 806, GPU 848, ML accelerator 854, vision processing unit 856, or the like). For example, storage device 850 can store instructions for hardware accelerator 102, host 104, activation unit 308, processing engine 400, or the like.

Processor 804 couples to a chipset 832 via P2P interface 828 and P2P 834 while processor 806 couples to a chipset 832 via P2P interface 830 and P2P 836. Direct media interface (DMI) 876 and DMI 878 may couple the P2P interface 828 and the P2P 834 and the P2P interface 830 and P2P 836, respectively. DMI 876 and DMI 878 may be a high-speed interconnect that facilitates, e.g., eight Giga Transfers per second (GT/s) such as DMI 3.0. In other embodiments, the processor 804 and processor 806 may interconnect via a bus.

The chipset 832 may comprise a controller hub such as a platform controller hub (PCH). The chipset 832 may include a system clock to perform clocking functions and include interfaces for an I/O bus such as a universal serial bus (USB), peripheral component interconnects (PCIs), serial peripheral interconnects (SPIs), integrated interconnects (I2Cs), and the like, to facilitate connection of peripheral devices on the platform. In other embodiments, the chipset 832 may comprise more than one controller hub such as a chipset with a memory controller hub, a graphics controller hub, and an input/output (I/O) controller hub.

In the depicted example, chipset 832 couples with a trusted platform module (TPM) 844 and UEFI, BIOS, FLASH circuitry 846 via I/F 842. The TPM 844 is a dedicated microcontroller designed to secure hardware by integrating cryptographic keys into devices. The UEFI, BIOS, FLASH circuitry 846 may provide pre-boot code.

Furthermore, chipset 832 includes the I/F 838 to couple chipset 832 with a high-performance graphics engine, such as, graphics processing circuitry or a graphics processing unit (GPU) 848. In other embodiments, the system 800 may include a flexible display interface (FDI) (not shown) between the processor 804 and/or the processor 806 and the chipset 832. The FDI interconnects a graphics processor core in one or more of processor 804 and/or processor 806 with the chipset 832.

Additionally, ML accelerator 854 and/or vision processing unit 856 can be coupled to chipset 832 via I/F 838. ML accelerator 854 can be circuitry arranged to execute ML related operations (e.g., training, inference, etc.) for ML models. Likewise, vision processing unit 856 can be circuitry arranged to execute vision processing specific or related operations. In particular, ML accelerator 854 and/or vision processing unit 856 can be arranged to execute mathematical operations and/or operands useful for machine learning, neural network processing, artificial intelligence, vision processing, etc.

Various I/O devices 860 and display 852 couple to the bus 872, along with a bus bridge 858 which couples the bus 872 to a second bus 874 and an I/F 840 that connects the bus 872 with the chipset 832. In one embodiment, the second bus 874 may be a low pin count (LPC) bus. Various devices may couple to the second bus 874 including, for example, a keyboard 862, a mouse 864 and communication devices 866.

Furthermore, an audio I/O 868 may couple to second bus 874. Many of the I/O devices 860 and communication devices 866 may reside on the motherboard or system-on-chip (SoC) 802 while the keyboard 862 and the mouse 864 may be add-on peripherals. In other embodiments, some or all the I/O devices 860 and communication devices 866 are add-on peripherals and do not reside on the motherboard or system-on-chip (SoC) 802.

Figure 9:
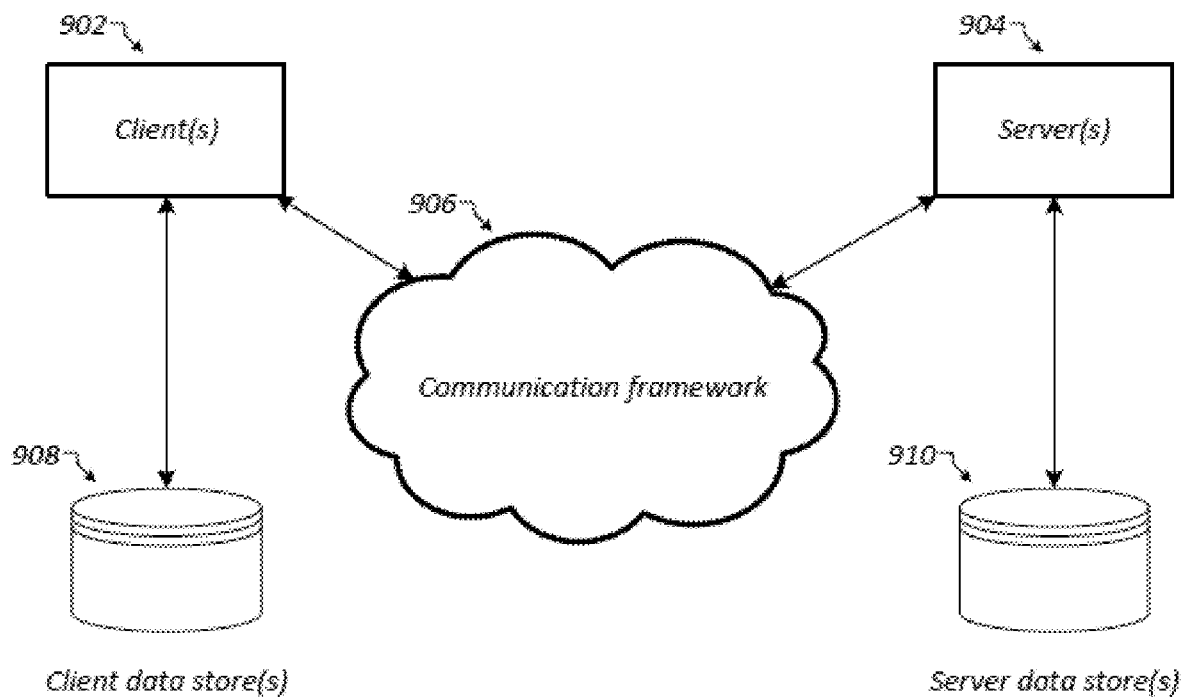
FIG. 9 illustrates exemplary aspects of a communications architecture according to one or more embodiments described herein.

FIG. 9 illustrates a block diagram of an exemplary communications architecture 900 suitable for implementing various embodiments as previously described, such as communications between hardware accelerator 102 and host 104. The communications architecture 900 includes various common communications elements, such as a transmitter, receiver, transceiver, radio, network interface, baseband processor, antenna, amplifiers, filters, power supplies, and so forth. The embodiments, however, are not limited to implementation by the communications architecture 900.

As shown in FIG. 9, the communications architecture 900 comprises includes one or more clients 902 and servers 904. In some embodiments, communications architecture may include or implement one or more portions of components, applications, and/or techniques described hereby. The clients 902 and the servers 904 are operatively connected to one or more respective client data stores 908 and server data stores 910 that can be employed to store information local to the respective clients 902 and servers 904, such as cookies and/or associated contextual information. In various embodiments, any one of servers 904 may implement one or more of logic flows or operations described hereby, such as in conjunction with storage of data received from any one of clients 902 on any of server data stores 910. In one or more embodiments, one or more of client data store(s) 908 or server data store(s) 910 may include memory accessible to one or more portions of components, applications, and/or techniques described hereby.

The clients 902 and the servers 904 may communicate information between each other using a communication framework 906. The communications framework 906 may implement any well-known communications techniques and protocols. The communications framework 906 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 906 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1900 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 902 and the servers 904. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described hereby. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following examples pertain to further embodiments, from which numerous permutations and configurations will be apparent.

Example 1 includes a hardware accelerator comprising a first matrix vector unit comprised in circuitry, the first matrix vector unit to compute a gated recurrent unit (GRU) step for a current layer of a neural network; and a second matrix vector unit comprised in circuitry, the second matrix vector unit to compute an output feature vector for a next layer of the neural network, wherein at least a portion of computation by the first matrix vector unit of the GRU step for the current layer overlaps at least a portion of computation by the second matrix vector unit of the output feature vector for the next layer of the neural network.

Example 2 includes the subject matter of Example 1, the neural network comprising a bi-directional, multi-layered gated recurrent unit (GRU) and linear classifier neural network.

Example 3 includes the subject matter of Example 1, comprising an activation unit comprised in circuitry, wherein the first matrix vector unit generates a current output vector based on an input feature vector for the current layer of the neural network, and the activation unit generates an activation vector based on the current output vector generated by the first matrix vector unit.

Example 4 includes the subject matter of Example 3, wherein the second matrix vector unit comprised in circuitry, the second matrix vector to generate the feature vector for the next layer of the neural network based on the activation vector generated by the activation unit.

Example 5 includes the subject matter of Example 1, wherein the first matrix vector unit and the second matrix vector unit implement at least a portion of a sequence-to-sequence modelling application.

Example 6 includes the subject matter of Example 5, the sequence-to-sequence modelling application comprising one or more of speech recognition, natural language processing, and genomic data processing.

Example 7 includes the subject matter of Example 1, comprising a memory controller comprised in circuitry, the memory controller to transfer the output feature vector for the next layer of the neural network to a host memory in an output data transfer, wherein at least a portion of computation of the GRU step for the current layer of the neural network by the first matrix vector unit overlaps at least a portion of the output data transfer.

Example 8 includes the subject matter of Example 1, comprising a memory controller comprised in circuitry, the memory controller to receive an input feature vector for the current layer of the neural network from a host memory in an input data transfer, wherein at least a portion of computation of the output feature vector for the next layer of the neural network by the second matrix vector unit overlaps at least a portion of the input data transfer.

Example 9 includes the subject matter of Example 1, comprising a memory controller comprised in circuitry, the memory controller to receive an input feature vector for the current layer of the neural network from a host memory in an input data transfer, and the memory controller to transfer the output feature vector for the next layer of the neural network to the host memory in an output data transfer, wherein the input data transfer and the output data transfer utilize a common port to access the host memory.

Example 10 includes the subject matter of Example 1, wherein one or more of computation by the first matrix vector unit of the GRU step for the current layer and computation by the second matrix vector unit of the output feature vector for the next layer of the neural network utilizes a weight matrix quantized to two or three bits.

Example 11 is at least one non-transitory computer-readable medium comprising a set of instructions that, in response to being executed by a processor circuit, cause the processor circuit to: compute, with a first matrix vector unit comprised in circuitry, a gated recurrent unit (GRU) step for a current layer of a neural network; and compute, with a second matrix vector unit comprised in circuitry, an output feature vector for a next layer of the neural network, wherein at least a portion of computation by the first matrix vector unit of the GRU step for the current layer overlaps at least a portion of computation by the second matrix vector unit of the output feature vector for the next layer of the neural network.

Example 12 includes the subject matter of Example 11, comprising instructions that, in response to being executed by the processor circuit cause the processor circuit to: generate, with the first matrix vector unit, a current output vector based on an input feature vector for the current layer of the neural network; and generate, with an activation unit comprised in circuitry, an activation vector based on the current output vector generated by the first matrix vector unit.

Example 13 includes the subject matter of Example 12, comprising instructions that, in response to being executed by the processor circuit cause the processor circuit to generate, with the second matrix vector unit, the feature vector for the next layer of the neural network based on the activation vector generated by the activation unit.

Example 14 includes the subject matter of Example 11, comprising instructions that, in response to being executed by the processor circuit cause the processor circuit to transfer, with a memory controller comprised in circuitry, the output feature vector for the net layer of the neural network to a host memory in an output data transfer, wherein at least a portion of computation of the GRU step for the current layer of the neural network by the first matrix vector unit overlaps at least a portion of the output data transfer.

Example 15 includes the subject matter of Example 11, comprising instructions that, in response to being executed by the processor circuit cause the processor circuit to receive, with a memory controller comprised in circuitry, an input feature vector for the current layer of the neural network from a host memory in an input data transfer, wherein at least a portion of computation of the output feature vector for the next layer of the neural network by the second matrix vector unit overlaps at least a portion of the input data transfer.

Example 16 includes the subject matter of Example 11, comprising instructions that, in response to being executed by the processor circuit cause the processor circuit to:

receive, with a memory controller comprised in circuitry, an input feature vector for the current layer of the neural network from a host memory in an input data transfer; and transfer, with the memory controller, the output feature vector for the next layer of the neural network to the host memory in an output data transfer, wherein the input data transfer and the output data transfer utilize a common port to access the host memory.

Example 17 is a computer-implemented method, comprising: computing, with a first matrix vector unit comprised in circuitry, a gated recurrent unit (GRU) step for a current layer of a neural network; and computing, with a second matrix vector unit comprised in circuitry, an output feature vector for a next layer of the neural network, wherein at least a portion of computation by the first matrix vector unit of the GRU step for the current layer overlaps at least a portion of computation by the second matrix vector unit of the output feature vector for the next layer of the neural network.

Example 18 includes the subject matter of Example 17, comprising: generating, with the first matrix vector unit, a current output vector based on an input feature vector for the current layer of the neural network; and generating, with an activation unit comprised in circuitry, an activation vector based on the current output vector generated by the first matrix vector unit.

Example 19 includes the subject matter of Example 18, comprising generating, with the second matrix vector unit, the feature vector for the next layer of the neural network based on the activation vector generated by the activation unit.

Example 20 includes the subject matter of Example 16, comprising transferring, with a memory controller comprised in circuitry, the output feature vector for the net layer of the neural network to a host memory in an output data transfer, wherein at least a portion of computation of the GRU step for the current layer of the neural network by the first matrix vector unit overlaps at least a portion of the output data transfer.

Example 21 is an apparatus, comprising: means for computing, with a first matrix vector unit comprised in circuitry, a gated recurrent unit (GRU) step for a current layer of a neural network; and means for computing, with a second matrix vector unit comprised in circuitry, an output feature vector for a next layer of the neural network, wherein at least a portion of computation by the first matrix vector unit of the GRU step for the current layer overlaps at least a portion of computation by the second matrix vector unit of the output feature vector for the next layer of the neural network.

Example 22 includes the subject matter of Example 21, comprising: means for generating, with the first matrix vector unit, a current output vector based on an input feature vector for the current layer of the neural network; and means for generating, with an activation unit comprised in circuitry, an activation vector based on the current output vector generated by the first matrix vector unit.

Example 23 includes the subject matter of example 22, comprising means for generating, with the second matrix vector unit, the feature vector for the next layer of the neural network based on the activation vector generated by the activation unit.

Example 24 includes the subject matter of Example 21, comprising means for transferring, with a memory controller comprised in circuitry, the output feature vector for the net layer of the neural network to a host memory in an output data transfer, wherein at least a portion of computation of the GRU step for the current layer of the neural network by the first matrix vector unit overlaps at least a portion of the output data transfer.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner and may generally include any set of one or more limitations as variously disclosed or otherwise demonstrated hereby.

What is claimed is:

1. An apparatus, comprising:
   interface circuitry;
   a memory controller:
   machine-readable instructions; and
   at least one processor circuit to be programmed by the machine-readable instructions to:
      generate a first output vector, the first output vector determined based on a gated current unit (GRU) step computation for a first layer of a neural network;
      generate an output feature vector for a second layer of the neural network, wherein at least a portion of of the GRU step computation for the first layer overlaps at least a portion of a linear classifier (LC) step computation of the output feature vector for the second layer of the neural network; and
      generate an activation vector based on the first output vector, the LC step computation based on the activation vector, the activation vector stored in a buffer by the memory controller between iterations of the GRU step computation or the LC step computation involving a GRU weight matrix or an LC weight matrix.

2. The apparatus of claim 1, the neural network including a bi-directional, multi-layered GRU, and a linear classifier neural network.

3. The apparatus of claim 1, wherein the first output vector is based on an input feature vector for the first layer of the neural network.

4. The apparatus of claim 3, wherein one or more of the at least one processor circuit is to generate the output feature vector for the second layer of the neural network based on the activation vector.

5. The apparatus of claim 1, wherein one or more of the at least one processor circuit is to implement at least a portion of a sequence-to-sequence modelling application.

6. The apparatus of claim 5, the sequence-to-sequence modelling application including one or more of speech recognition, natural language processing, and genomic data processing.

7. The apparatus of claim 1, wherein the memory controller is to transfer the output feature vector for the second layer of the neural network to a host memory in an output data transfer, wherein at least a portion of the GRU step computation for the first layer of the neural network overlaps at least a portion of the output data transfer.

8. The apparatus of claim 1, wherein the memory controller is to receive an input feature vector for the first layer of the neural network from a host memory in an input data transfer, wherein at least a portion of computation of the output feature vector for the second layer of the neural network overlaps at least a portion of the input data transfer.

9. The apparatus of claim 1, rein the memory controller is to receive an input feature vector for the first layer of the neural network from a host memory in an input data transfer and transfer the output feature vector for the second layer of the neural network to the host memory in an output data transfer, wherein the input data transfer and the output data transfer utilize a common port to access the host memory.

10. The apparatus of claim 1, wherein one or more of the GRU step computation for the first layer and the LC step computation of the output feature vector for the second layer of the neural network utilizes the GRU weight matrix or the LC weight matrix quantized to two or three bits.

11. The apparatus of claim 1, wherein the LC step computation is used for feature extraction and the GRU step computation is used for learning dependencies across an input sequence.

12. The apparatus of claim 11, wherein, when the input sequence is associated with speech processing, the LC step computation extracts word or character combinations and the GRU step computation learns word or character dependencies.

13. The apparatus of claim 1, wherein the GRU step computation and the LC step computation is combined with an initial convolutional neural network (CNN) layer as part of an inference phase.

14. At least one non-transitory computer-readable medium comprising a set of instructions that, when executed by a processor circuit, cause the processor circuit to:
generate a first output vector, the first output vector determined based on a gated current unit (GRU) step computation for a first layer of a neural network;
generate an output feature vector for a second layer of the neural network, wherein at least a portion of the GRU step computation for the first layer overlaps at least a portion of nit a linear classifier (LC) step computation of the output feature vector for the second layer of the neural network; and
generate an activation vector based on the first output vector, the LC step computation based on the activation vector, the activation vector stored in a buffer using a memory controller implemented in circuitry, the activation vector to be stored between iterations of the GRU step computation or the LC step computation involving a GRU weight matrix or an LC weight matrix.

15. The non-transitory computer-readable medium of claim 14, wherein the instructions, when executed by the processor circuit, cause the processor circuit to generate the output feature vector for the second layer of the neural network based on the activation vector.

16. The non-transitory computer-readable medium of claim 14, wherein the instructions, when executed by the processor circuit, cause the processor circuit to transfer, using the memory controller, the output feature vector for the second layer of the neural network to a host memory in an output data transfer, wherein at least a portion of the GRU step computation for the first layer of the neural network overlaps at least a portion of the output data transfer.

17. The non-transitory computer-readable medium of claim 14, wherein the instructions, when executed by the processor circuit, cause the processor circuit to receive, using the memory controller, an input feature vector for the first layer of the neural network from a host memory in an input data transfer, wherein at least a portion of computation of the output feature vector for the second layer of the neural network overlaps at least a portion of the input data transfer.

18. The non-transitory computer-readable medium of claim 14, wherein the instructions, when executed by the processor circuit, cause the processor circuit to:
receive, using the memory controller, an input feature vector for the first layer of the neural network from a host memory in an input data transfer; and
transfer, with the memory controller, the output feature vector for the second layer of the neural network to the host memory in an output data transfer, wherein the input data transfer and the output data transfer utilize a common port to access the host memory.

* * * * *